No. 718,137. PATENTED JAN. 13, 1903.
J. MAILLÉ.
CARRIAGE SPRING.
APPLICATION FILED MAY 12, 1902.
NO MODEL.
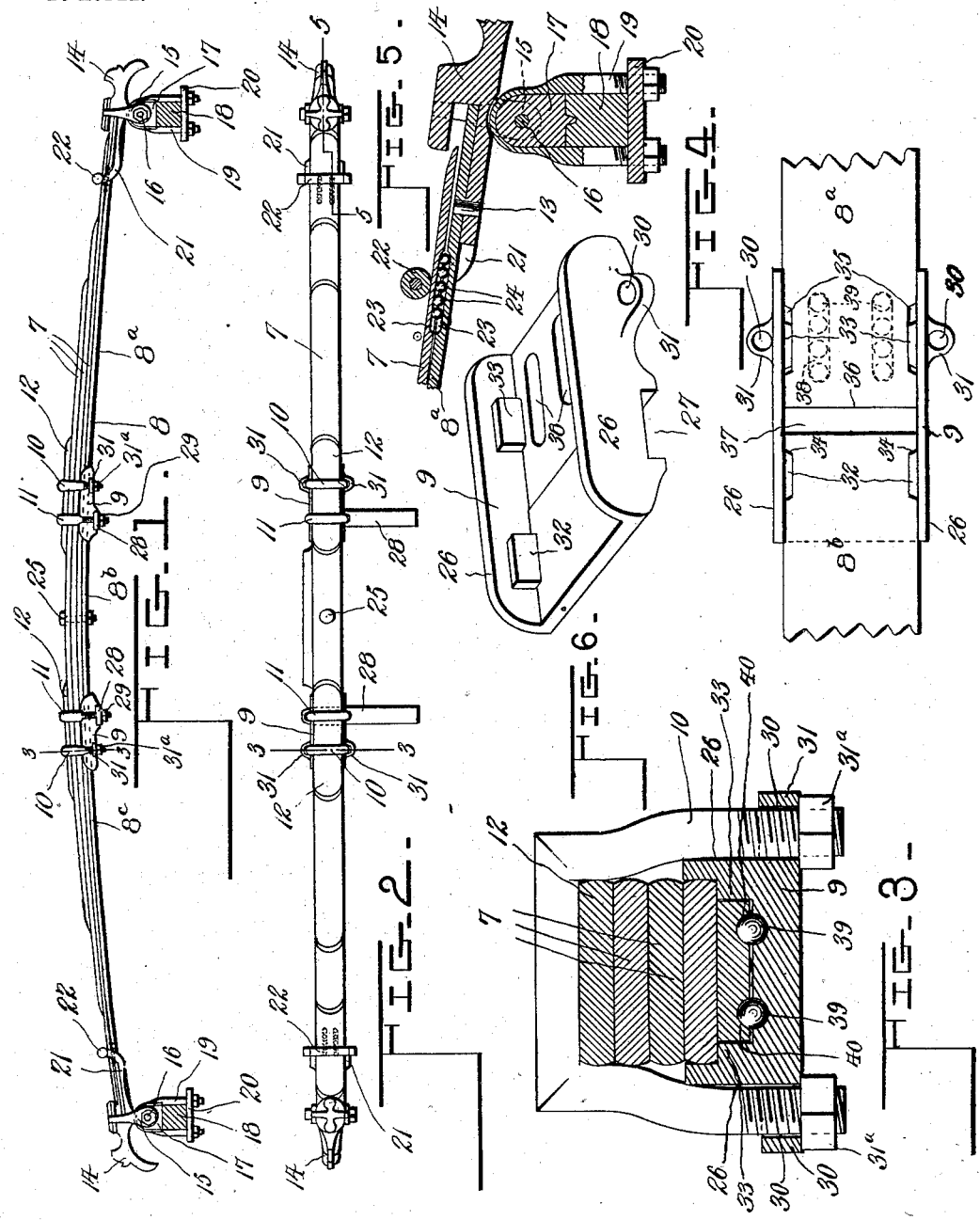
Witnesses:
Jules Maillé, Inventor,
By Marion & Marion
Attorneys

UNITED STATES PATENT OFFICE.

JULES MAILLÉ, OF ST. JEROME, CANADA.

CARRIAGE-SPRING.

SPECIFICATION forming part of Letters Patent No. 718,137, dated January 13, 1903.

Application filed May 12, 1902. Serial No. 106,913. (No model.)

*To all whom it may concern:*

Be it known that I, JULES MAILLÉ, a subject of the King of England, residing at St. Jerome, county of Terrebonne, Province of Quebec, Canada, have invented certain new and useful Improvements in Carriage-Springs; and I do hereby declare that the following is a full, clear, and exact description of the invention, such as will enable others skilled in the art to which it appertains to make and use the same.

My invention relates to a carriage or wagon spring of the half-elliptic type formed of a series of overlaid elastic plates, which are clamped together and adapted to act at once separately and conjointly in their elastic properties. In the ordinary type of this spring now in use the several plates constituting the spring are made separate from one another in order to increase the elasticity on well-known principles by enabling the several plates to slide on one another in the bending of the spring, and thus avoid unnecessary compressive and extensive forces acting on the different members; but, on the other hand, the friction between the plates in this sliding movement is very great comparatively, owing to the force pressing the plates together, and as no provision, so far as I am aware, has yet been made for relieving this friction the consequence is not only to rapidly wear out the parts of the spring, but also to much diminish the resiliency which might be obtained should this friction not exist.

It is my object in the present invention to provide means for reducing or avoiding the friction between the several plates constituting the spring, and thus to make the spring perfectly elastic.

To these ends my invention consists, essentially, in a spring having the separate members thereof separated by a series of small steel balls, which are adapted to roll back and forward in grooves formed opposite one another in each pair of opposing members, so that the two plates being thus separated by rolling members have practically no friction in their movements upon each other.

My invention further consists in the construction and combination of parts hereinafter described and more particularly pointed out in the claims.

In the drawings accompanying this specification I have illustrated one form of my invention, wherein—

Figure 1 is a side elevation of my improved carriage-spring. Fig. 2 is a plan view thereof. Fig. 3 is a transverse vertical section, on an enlarged scale, taken on the line 3 3 of Figs. 1 and 2. Fig. 4 is a fragmentary plan view, on an enlarged scale, showing the arrangement of the central portion of the spring, the upper plates being removed. Fig. 5 is a longitudinal vertical section taken on the line 5 5 of Fig. 2, and Fig. 6 is a perspective view of the clip-casting adapted to retain the parts of the spring in place.

The same numerals of reference denote like parts in each of the several figures of the drawings.

The spring, as shown in Fig. 1, is made up of a series of three or more overlaid plates 7 and a lower plate 8, which is not integral, but is divided into three sections $8^a$, $8^b$, and $8^c$, which are joined together, and the parts of the spring are retained in place by a pair of clip-castings 9 of the shape shown in Fig. 6 and each bolted onto the spring by a pair of U-shaped clips 10 11, which are provided with wear-plates 12 at the bends, shielding the upper plate 7 from the bolts 10 and 11. The plates 7 and 8 are of different lengths, as shown, the lowermost plate 7 and the plate 8 being extended to the end of the spring and the latter being connected—as, for instance, by rivets 13—to the end casting 14, which has pivot-ears 15, carrying a pivot-bolt 16, turning in a pillow-block 17, secured on the axle 18 of the vehicle by clips 19, bolted fast by means of plates 20. The casting 14 has an inwardly and upwardly extending pair of arms 21, which carry between them a roller 22, located on the upper side of the lowermost spring-plate 7 and which holds the end of the latter down. Between the two opposing faces of the plates 7 and 8 at the outer ends thereof there are formed, as shown, the semicylindrical grooves 23, the two together forming a raceway for a series of balls 24, which are mounted between the plates and hold them apart, as shown in Fig. 5.

All the spring-plates 7 and 8 are bolted together at the center by a bolt 25, passing through central apertures therein; but only the central section 8ᵇ of the long plate 8 is thus attached, its ends being held within and between the two ends of the two castings 9, which, as shown, have side flanges 26, rising above the sides of the plate 8 and the lowermost plate 7. The casting 9 has on its lower side and inner end a transverse grooved recess 27, in which is seated a plate 28, which forms means for securing the nuts 29 on the ends of the clip-bolt 11; but the other clip-bolt 10 has its ends passed through apertures 30 in the ears 31 on the sides of the casting 9 and bolted thereto by nuts 31ᵃ. On the inner side of each flange 26 and at each end of the casting 9 are a pair of inwardly-projecting lugs 32 and 33, with the former pair of which engage the lateral edges of the section 8ᵇ of the spring-plate 8, being notched or recessed, as shown at 34, for this purpose, so as to permit of a small degree of longitudinal motion, but to prevent the casting 9 from sliding away or out of place with relation to the end of the plate 8ᵇ. The two outer sections 8ᵃ and 8ᶜ of the spring-plate 8 are likewise engaged with the lugs 33 by notches 35, these notches being made considerably longer than the length of the lugs 33, as shown in Fig. 4, in order to give a considerably greater degree of play to the plates 8ᵃ and 8ᶜ, and to this end the inner end 36 of these sections does not abut abruptly against the end of the section 8ᵇ, but there is a certain space 37 left between them. I prefer to form on the upper surface of the casting 9 a pair of semicylindrical grooves 38, in which roll balls 39, which are likewise seated in semicylindrical grooves 40, formed on the under surface of each of the plates 8ᵃ and 8ᶜ, there preferably being two rows of these balls, as shown in Fig. 4, and their diameter being such as to hold the plate-sections 8ᵃ and 8ᶜ at a slight distance away from the face of the casting 9, as shown in Fig. 3.

It will be seen that when the spring is bent the plate 8ᵃ is caused to be effectively contracted or shortened by the approximation of the sections 8ᵃ, 8ᵇ, and 8ᶜ thereof, which slide or roll upon the castings 9, while the effective length of the lowermost plate 7 is effectively diminished by the rolling of its end upon the balls 24, thus causing the different plates to act separately and to increase the resiliency and perfect the elasticity of the spring.

It will of course be understood that while I have shown the ball-bearings in only two places and between two of the spring-plates they may when perfect resiliency is desired be placed equally well between any or all of the other pairs of spring-plates.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included in the scope of the following claims or of mechanical equivalents to the structure set forth.

Having thus described my invention, what I claim as new, and desire to secure by Letters Patent, is—

1. A spring comprising a series of overlaid plates, and metallic balls arranged to roll between the sliding parts of the adjacent pairs of plates.

2. A spring comprising a series of overlaid plates, means for supporting the lowermost of said plates, and a series of balls arranged to roll longitudinally in shallow grooves formed between the opposing surfaces of the plates.

3. A spring comprising a series of overlaid plates of unequal length, the longest being lowermost, a pair of castings connected to the respective ends of the lowermost plate, a series of balls arranged to roll in opposing shallow grooves formed between said lowermost and the next adjacent plate, and a roller carried by said end casting and adapted to roll on the upper surface of said adjacent plate to hold the same down in place.

4. A half-elliptic spring comprising a series of overlaid plates the lowermost of which is in three sections arranged end to end to form a continuous curve, and clips overlapping the abutting ends of the plates and holding them in line and forming slip-joints permitting endwise movement of the plates.

5. A half-elliptic spring comprising a series of overlaid plates the lowermost of which is divided into three symmetrical sections arranged end to end to form a continuous curve, a pair of clip-castings overlapping the lower sides of the abutting ends, and clip-bolts embracing all the plates and the castings and connecting the parts together, whereby the sections of the lowermost plate are held in position end for end while permitting the sliding movement of said sections relatively to said castings.

6. In a half-elliptic spring, a spring-plate comprised of three sections laid end to end, and each pair of abutting sections having notches in its ends, a clip-casting embracing said abutting ends and having two pairs of lugs each embracing one of said notches, and means for clamping said castings and spring-sections to the remainder of the spring, substantially as described.

7. In a half-elliptic spring, a spring-plate comprised of three sections laid end for end, and each pair of abutting sections having notches in its ends, a clip-casting embracing said abutting ends and having two pairs of lugs each embracing one of said notches, means for clamping said castings and spring-sections to the remainder of the spring, and a series of antifriction-rollers adapted to roll in shallow grooves formed in the abutting faces of said castings and the spring-sections and hold them slightly apart, whereby to permit the parts to be firmly clamped together while permitting the motion of said outermost plate-sections relatively to said casting.

8. A spring comprising a series of overlaid plates of successively longer length from top to bottom, end castings attached to the lowermost plate, pivots in which said end castings turn, friction-rollers located in shallow grooves formed in the opposing faces of the successive plates, said lowermost plate being formed in a plurality of sections placed end to end, and means for clamping said sections in position while permitting their relative movement.

9. A spring comprising a series of overlaid plates of successively longer length from top to bottom, end castings attached to the lowermost plate, pivots in which said end castings turn, friction-rollers located in shallow grooves formed in the opposing faces of the successive plates, said lowermost plate being formed in a plurality of sections placed end to end, and means for clamping said sections in position while permitting their relative movement, said means comprising flanged clip-castings having side lugs engaging in notches in the edges of said plate-sections, and antifriction-rollers arranged to roll in shallow grooves on the upper face of said castings and on the lower opposing face of said plate-sections, substantially as described.

In witness whereof I have hereunto set my hand in the presence of two witnesses.

JULES MAILLÉ.

Witnesses:
EMMA ARCHAMBAULT,
J. C. GAGNÉ.